United States Patent [19]

Marshall

[11] Patent Number: 5,431,281
[45] Date of Patent: Jul. 11, 1995

[54] CASSETTE TAPE HOLDER

[76] Inventor: Floyd R. Marshall, 2201 Redwood Rd., Napa, Calif. 94558

[21] Appl. No.: 232,333

[22] Filed: Apr. 21, 1994

Related U.S. Application Data

[63] Continuation of Ser. No. 60,650, May 13, 1993, abandoned.

[51] Int. Cl.[6] .............................................. B65D 85/67
[52] U.S. Cl. .................... 206/387.1; 206/493
[58] Field of Search ............... 206/387, 493; D6/407; 292/198, 199

[56] References Cited

U.S. PATENT DOCUMENTS

| | | | |
|---|---|---|---|
| D. 221,915 | 9/1971 | Goldthwaite | 206/557 X |
| 3,642,337 | 2/1972 | Manheim | 206/387 X |
| 4,049,119 | 9/1977 | Wilson | 206/387 |
| 4,067,629 | 1/1978 | Amatsu et al. | 206/387 X |
| 4,119,200 | 10/1978 | Cassidy et al. | 206/387 |
| 4,154,341 | 5/1979 | Osanai | 206/387 |
| 4,304,331 | 12/1981 | Minkow | 206/387 |
| 4,330,161 | 5/1982 | Khawand | 206/387 X |
| 4,365,713 | 12/1982 | Ekvar | 206/387 |
| 4,428,480 | 1/1984 | Ackeret | 206/287 |
| 4,648,507 | 3/1987 | Komiyama et al. | 206/387 X |
| 5,160,028 | 11/1992 | Monta | 206/387 |

FOREIGN PATENT DOCUMENTS

| | | | |
|---|---|---|---|
| 0007315 | 1/1978 | Japan | 206/387 |
| 0053512 | 4/1979 | Japan | 206/387 |
| 3816384 | 11/1989 | Japan | 206/387 |

*Primary Examiner*—Bryon P. Gehman

[57] ABSTRACT

A cassette tape holder for preventing a cassette tape from unwinding during transportation that is of minimal size so that a large number of cassette tapes may be stored in a small space. The cassette tape holder includes a protective plate with two upward projections that engage the reels of the cassette tape so as to prevent their rotation. The cassette tape holder may then be used in place of a conventional, fully enclosed cassette container to lessen the amount of space needed to store and transport cassette tapes.

2 Claims, 5 Drawing Sheets

CASSETTE TAPE HOLDER

This application is a continuation of application Ser. No. 008/060,650, filed May 13, 1993, now abandoned.

BACKGROUND OF THE INVENTION

1. Field of the Invention

The present invention relates to cassette tape holders and more particularly pertains to cassette tape holders which may be used to prevent a cassette tape from unwinding during transportation while simultaneously being of minimal size so that a large number of cassette tapes may be stored in a small space.

2. Description of the Prior Art

The use of cassette tape containers is known in the prior art. More specifically, cassette tape containers heretofore devised and utilized for the purpose of containing cassette tapes are known to consist basically of familiar, expected and obvious structural configurations, notwithstanding the myriad of designs encompassed by the crowded prior art which have been developed for the fulfillment of countless objectives and requirements.

For example, U.S. Pat. No. 5,042,659 which issued to Morita discloses a magnetic tape cassette container that fully encloses a cassette tape and which is utilized by sliding the cassette tape through either of two open ends of the device and securing the cassette tape therein with a closure flap that engages the reels of the cassette tape.

Another container for cassette tapes can be seen in U.S. Pat. No. 4,951,820 which issued to Ackeret. This device includes an outer box of sufficient size to fully enclose a cassette tape stored therein on a transport slider that may be ejected from the box to facilitate removal of the cassette tape.

The cassette tape containers mentioned above completely enclose the cassette tape to be stored. This results in the need for a much larger storage area to accommodate the volume of the cassette tape as well as the volume of the storage case together. In addition, the cassette tape containers mentioned heretofore do not include the ability to rotate the reels within the cassette to rewind any excess tape that may be present outside of the cassette.

In this respect, the cassette tape holder according to the instant invention substantially departs from the conventional concepts and designs of the prior art, and in so doing provides an apparatus primarily developed for the purpose of preventing a cassette tape from unwinding during transportation that is of minimal size so that a large number of cassette tapes may be stored in a small space.

Therefore, it can be appreciated that there exists a continuing need for a new cassette tape holder which can be used to prevent the cassette tape from unwinding during transportation while simultaneously being of minimal size so that a large number of cassette tapes may be stored in a small space. In this regard, the present invention substantially fulfills this need.

SUMMARY OF THE INVENTION

In view of the foregoing disadvantages inherent in the known types of cassette tape containers now present in the prior art, the present invention provides a new cassette tape holder construction wherein the same can be utilized to prevent a cassette tape from unwinding during transportation while being of minimal size so that a large number of cassette tapes may be stored in a small space. As such, the general purpose of the present invention, which will be described subsequently in greater detail, is to provide a new cassette tape holder apparatus which has many of the advantages of the cassette tape containers mentioned heretofore and many novel features that result in a cassette tape holder that is not anticipated, rendered obvious, suggested, or even implied by any of the prior art, either alone or in any combination thereof.

To attain this, the present invention essentially comprises a protective plate proportionally sized to the top planar area of a cassette tape with two upward projections that engage the reels of the cassette tape to prevent their rotation. The cassette tape holder is of minimal size so that a large number of cassette tapes may be stored in a small space. The cassette tape holder may then be used in place of a conventional, fully enclosed cassette box to lessen the amount of space needed to store and transport such cassette tapes. The cassette tape holder may be constructed of any conceivable material suitable for performing the desired function including materials that are translucent and transparent notwithstanding the extensive number of materials applicable thereto.

A second embodiment of the present invention includes a first protective plate that is sized to completely cover one side of a cassette tape while also including a second protective plate orthogonally connected to the first protective plate and being operable to cover an exposed portion of the magnetic tape present within the cassette tape. The first protective plate further includes two upward projections for engagement with the reels present within the cassette tape, to restrict rotation of the reels. The projections may be of any conceivable size and shape possible while still retaining their intended function of engaging the reels of the cassette tape to restrict rotation of the reels.

A further embodiment comprises the features mentioned in the foregoing paragraph and further comprises upward projections sized to fit within and engage the reels of a cassette tape. The projections are rotatably connected, through apertures in the protective plate, to substantially flat disk members on the opposite side of the protective plate wherein such disk members may be manually rotated to turn the associated projections and their respective reels so as to rewind any excess tape that may be present outside of the cassette tape. The disk members are then discouraged from freely rotating by a slight frictional force present between the disk members and the protective plate as a result of conventional assembly techniques utilized therein.

An even further embodiment of the present invention comprises the aforementioned projections that engage the reels of the cassette tape and further provides retaining means in the form of pivotable keepers which are secured to the projections. The keepers may be utilized to capture the cassette reels on the respective projections to thereby prevent unintentional separation of the cassette tape holder from the associated cassette tape.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The heretofore and many novel features that result in a cassette tape holder that is not anticipated, rendered obvious, suggested, or even implied by any of the prior art, either alone or in any combination thereof.

It is another object of the present invention to provide a new cassette tape holder which may be easily and efficiently manufactured and marketed.

It is a further object of the present invention to provide a new cassette tape holder which is of a durable and reliable construction.

An even further object of the present invention is to provide a new cassette tape holder which is susceptible of a low cost of manufacture with regard to both materials and labor, and which accordingly is then susceptible of low prices of sale to the consuming public, thereby making such cassette tape holders economically available to the buying public.

Still yet another object of the present invention is to provide a new cassette tape holder which provides in the apparatuses and methods of the prior art some of the advantages thereof, while simultaneously overcoming some of the disadvantages normally associated therewith.

Still another object of the present invention is to provide a new cassette tape holder that may be used in place of a conventional, fully enclosed cassette box to lessen the amount of space needed to store and transport cassette tapes.

Yet another object of the present invention is to provide a new cassette tape holder that prevents the cassette tape from unwinding during transportation and which is of a minimal size so that a large number of cassette tapes may be stored in a small space.

Even still another object of the present invention is to provide a new cassette tape holder that may be utilized to rewind any excess tape which may be present outside of the cassette.

Yet even another object of the present invention is to provide a new cassette tape holder that may be releaseably secured to the cassette tape to prevent unintentional separation of the cassette tape and the associated cassette tape holder.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new cassette tape holder apparatus and method which has many of the advantages of the cassette tape holders mentioned the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENTS

Figure 1:
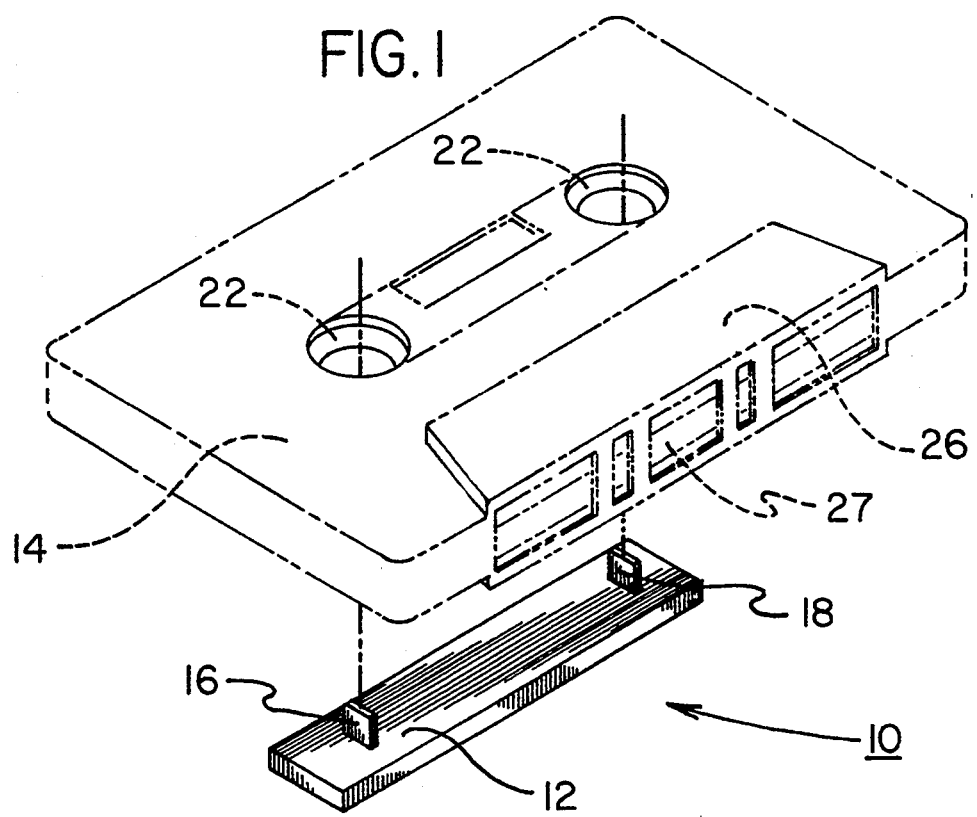
FIG. 1 is perspective view of a cassette tape holder comprising the present invention.
Figure 2:
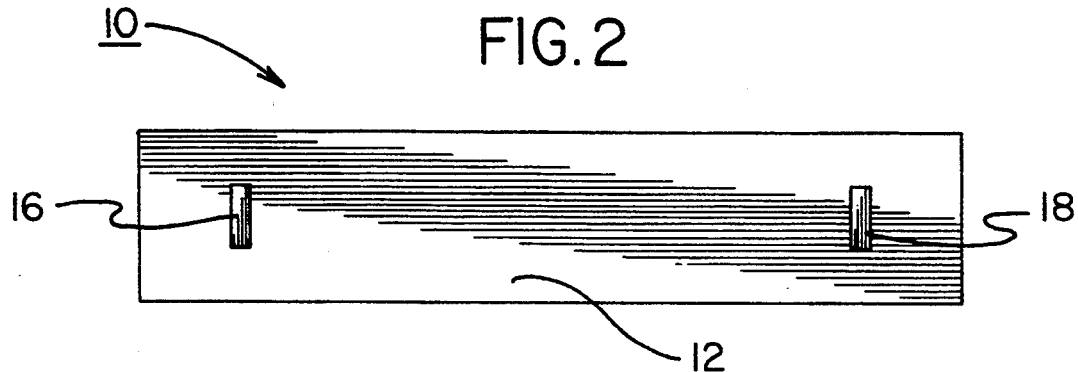
FIG. 2 is a top plan view of the present invention.
Figure 3:
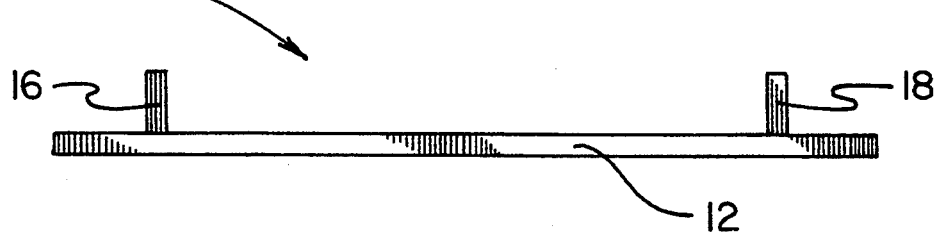
FIG. 3 is a side elevation view of the invention.
Figure 4:
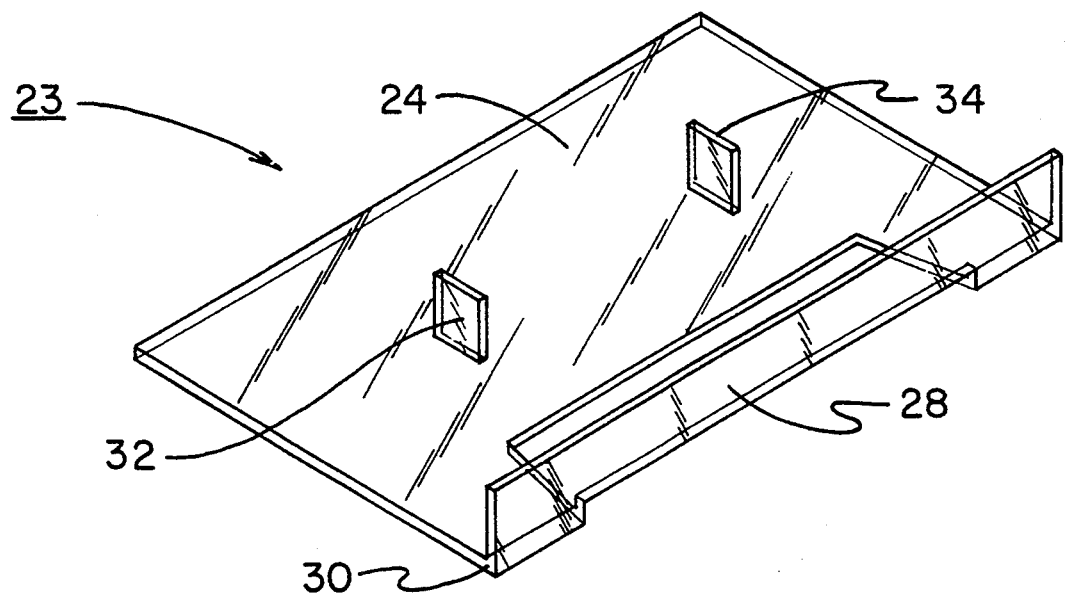
FIG. 4 is a perspective view of a second embodiment of the invention.
Figure 5:
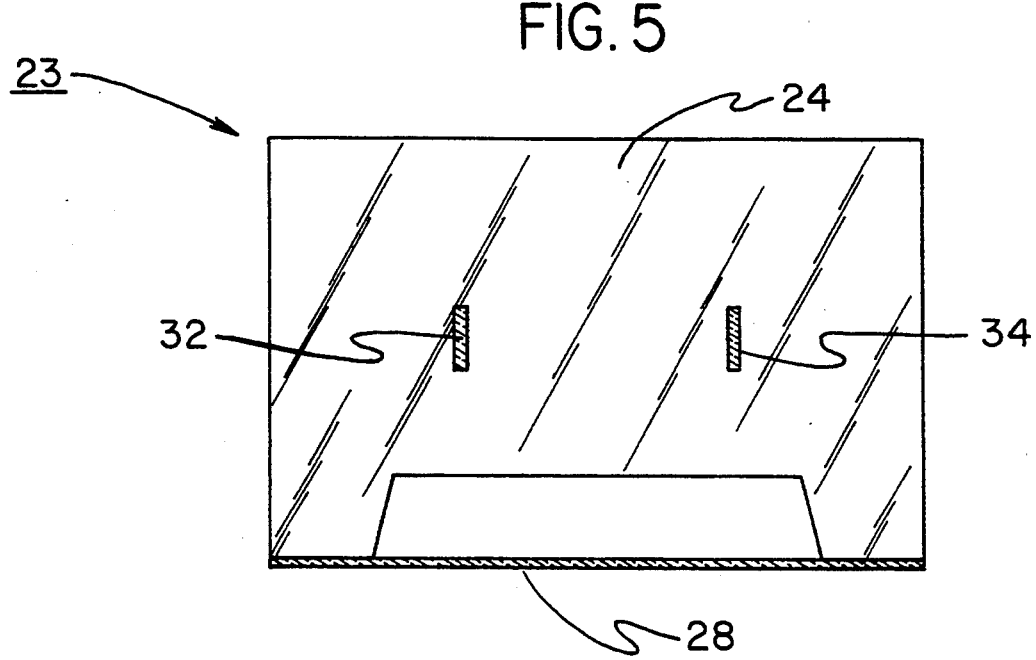
FIG. 5 is a top plan view of the second embodiment of the invention.
Figure 6:
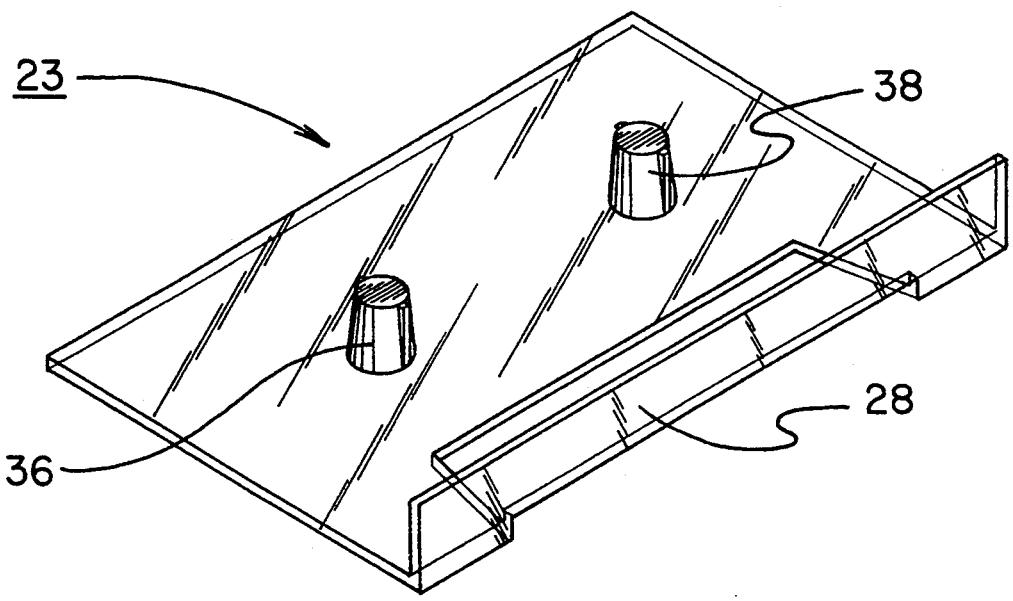
FIG. 6 is a perspective view of a further embodiment of the present invention.
Figure 7:
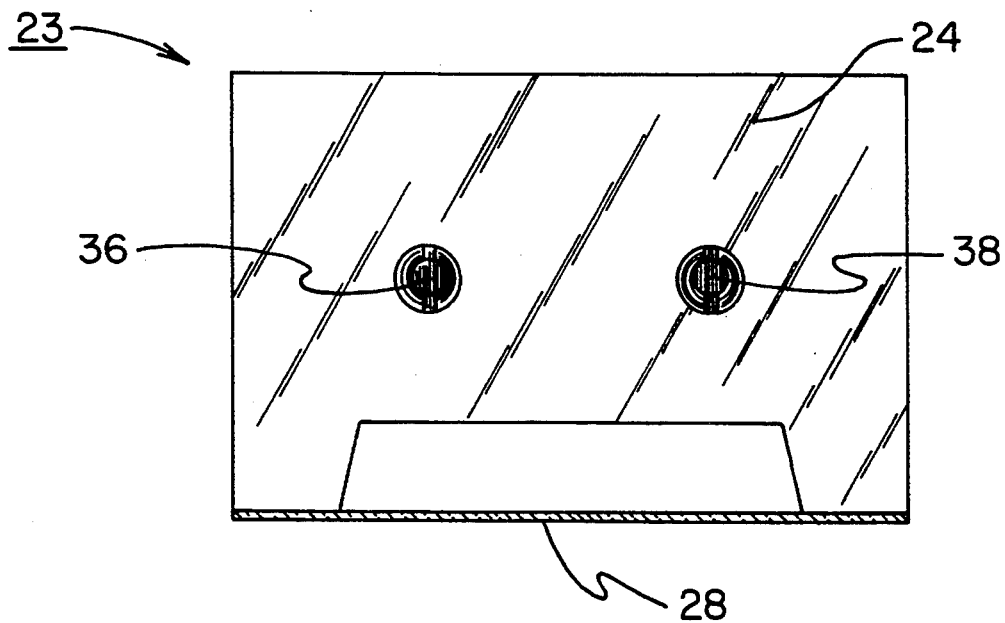
FIG. 7 is a top plan view of the further embodiment of the invention.

With reference now to the drawings, and in particular to FIGS. 1–3 thereof, a first embodiment of a new cassette tape holder embodying the principles and concepts of the present invention and generally designated by the reference numeral 10 will be described.

More specifically, it will be noted that cassette tape holder as shown in FIGS. 1–3 comprises a substantially rectangular protective plate 12 proportionally sized to the planform area of the top of a cassette tape 14 to which it is to be associated. The protective plate 12 is also equipped with two upward projections 16, 18 that engage the reels 20, 22 of the cassette tape 14 so as to prevent rotation of the reels. The upward projections 16, 18 are sized to snugly fit within the respective reels 20, 22 in such a manner so as to facilitate retention of the invention 10 to the cassette tape 14. The cassette tape holder 10 may be constructed of any conceivable material suitable for performing the desired function including materials that are translucent and transparent notwithstanding the extensive number of materials applicable thereto.

Referring now to FIG. 1 and FIGS. 4–7, a second embodiment 23 of the present invention comprises a first protective plate 24 that substantially covers the planar area defined by the planform area of the cassette tape 14 without covering the widened mouth area 26 of the cassette tape, so as to allow for the first protective plate and the cassette tape to lie within the same plane thereby to form a substantially flat package when said first protective plate and said cassette tape are placed together. A second protective plate 28 is orthogonally integrally joined to an edge 30 of the first protective plate 24 that is shaped in such a manner as to allow for accommodation of the widened mouth area 26 of the cassette tape 14. The second protective plate 28 is utilized to prevent unintentional contact with the tape 27 exposed at the widened mouth area 26 of the cassette tape 14. Emanating from the first protective plate 24 are two projections 32, 34 that are positioned on the protective plate so that the cassette tape reels 20, 22 will align and engage with the projections when the cassette tape 14 is placed on the invention 23.

Figure 10:
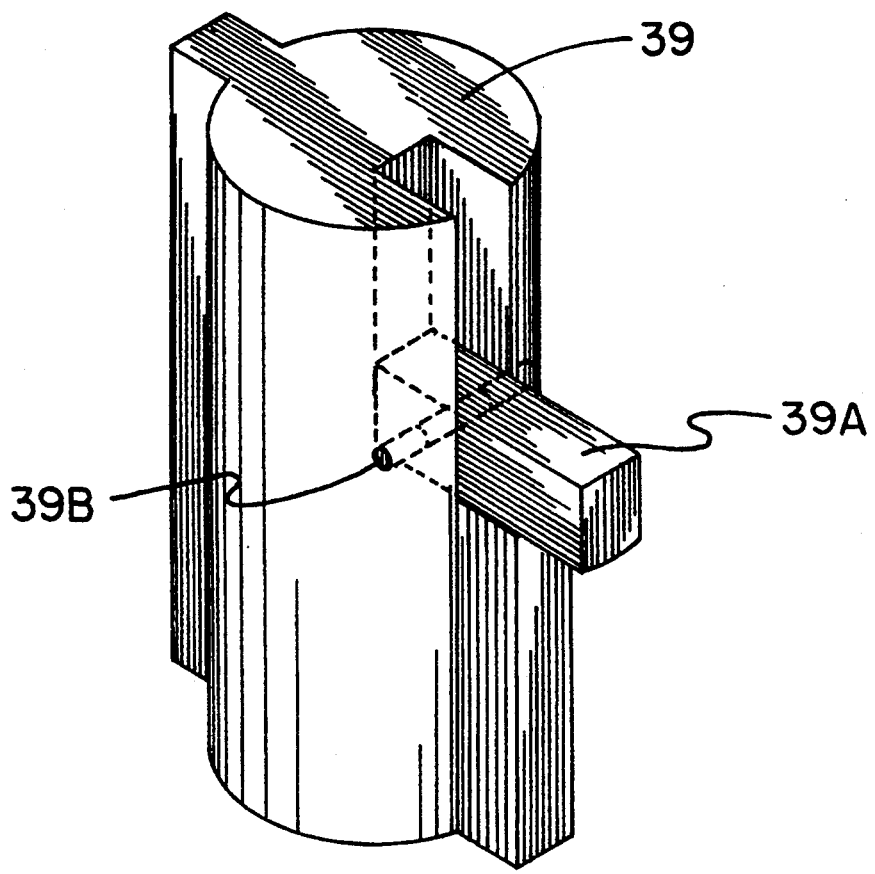
FIG. 10 is a perspective detail view of the locking mechanism present on the upward projection in an even further embodiment of the present invention.

The projections 32, 34 may be of any conceivable size and shape possible while still retaining their intended function of engaging the reels 20, 22 of the cassette tape 14 to prevent rotation of the reels. An example of the numerous possible variations in shape mentioned above are the projections 36, 38 that can be seen in FIGS. 6 and 7. Another possible projection variation that provides more secure attachment of invention 10 to the cassette tape 14 is shown in FIG. 10. The projection 39 includes a keeper 39A that pivots upon a keeper pin 39B so that the keeper may be stowed in an upward position (not shown) or extended as shown to prevent the associated reel from disengaging with the projection, thereby securing the cassette tape holder 10 to the cassette tape 14.

Figure 8:
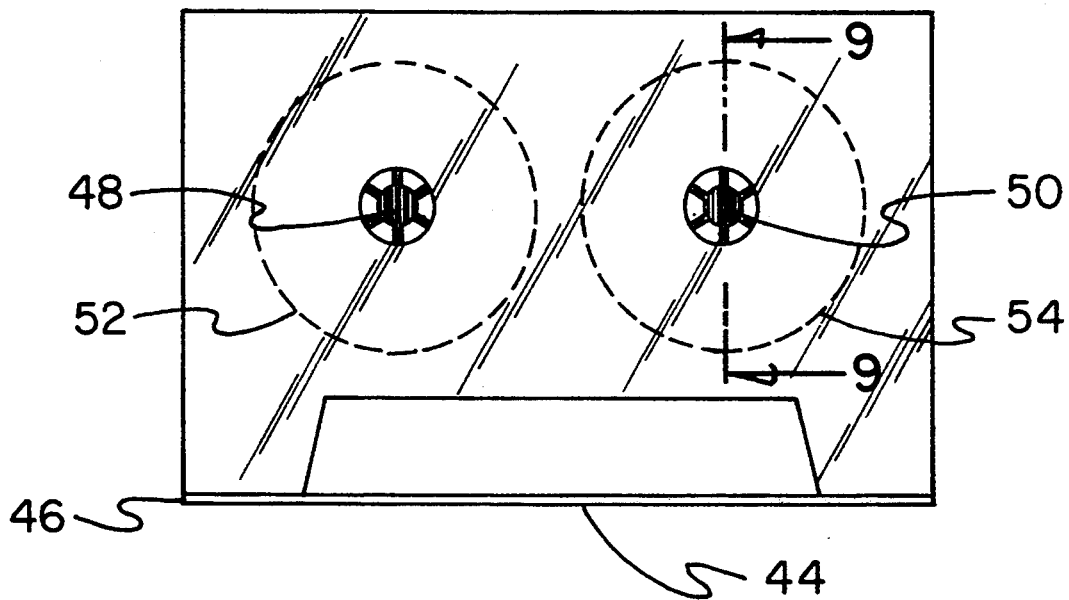
FIG. 8 is a top plan view of an even further embodiment of the present invention.
Figure 9:
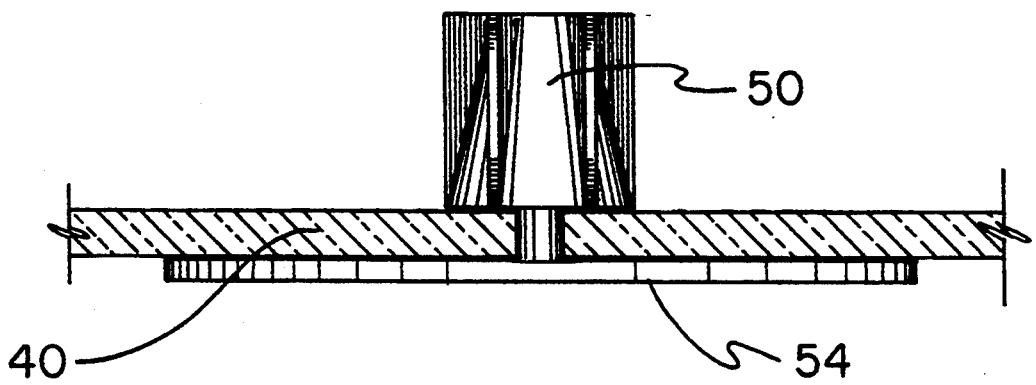
FIG. 9 is a cross sectional view taken along the line 9—9 of FIG. 8.

As best shown in FIGS. 8–9 and with concurrent reference to FIG. 1, a further embodiment 40 of the present invention comprises a first protective plate 42 that substantially covers the planar area defined by the planform area of the cassette tape 14 without covering the widened mouth area 26 of the cassette tape, thereby to allow for the first protective plate and the cassette tape to form a substantially flat planar package when said first protective plate and said cassette tape are placed together. The first protective plate 42 is further formed in such a manner as to define a pair of through-extending apertures (not shown) that are positioned in alignment with the reels 20, 22 of the cassette tape 14 when the cassette tape and the invention 40 are placed together. A second protective plate 44 is orthogonally integrally joined to an edge 46 of the first protective plate 42 and is shaped so as to allow for accommodation of the widened mouth area 26 of the cassette tape 14. The second protective plate 44 is utilized to prevent unintentional contact with the tape 27 exposed at the widened mouth area 26 of the cassette tape 14. Two reel contacts 48, 50 are rotatably positioned on the protective plate 42 so that the cassette tape reels 20, 22 will align and engage with the reel contacts when the cassette tape 14 is placed on the invention 40. The reel contacts 48, 50 are further respectively connected to a pair of substantially flat disk members 52, 54 that can be seen in the phantom detail of FIG. 8. The disk members 52, 54 may be manually rotated to turn the respective reel contacts 48, 50 and to further simultaneously turn the respective reels 20, 22 so as to rewind any excess tape that may be present outside of the cassette 14. The disk members 52, 54, the reel contacts 48, 50, and the reels 20, 22 are then discouraged from freely rotating by a slight frictional force present between the disk members and the first protective plate 42 as a result of conventional assembly techniques utilized therein that result in the tolerances necessary to provide a snug fit.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A holder for coupling to a tape cassette having a pair of longitudinally spaced sprocket wheels enclosed within a cassette tape housing, said cassette tape housing having front and rear major panels, a widened mouth area adjacent one side of said panels of said cassette tape housing, and a pair of longitudinally spaced housing openings through which drive means for rotating said sprocket wheels may be inserted in an orthogonal direction relative to said front and rear major panels of said cassette tape housing, said sprocket wheels having circumferentially arrayed cogs defining diametrical slots in said openings, each said diametrical slot being of a predetermined width, wherein said holder consists of:
 an elongate planar member having a pair of opposed and parallel flat surfaces, said planar member further having respect opposed first and second end edges, said first end edge being oriented parallel to said second end edge, with said first and second end edges being orthogonally oriented relative to said flat surfaces, said planar member still further having respect opposed first and second side edges, said first side edge being oriented parallel to said second side edge, with said first and second edges being orthogonally oriented relative to said flat surfaces, said holder being positionable into an abutting relationship with a said tape cassette housing such that said end edges of said planar member extend laterally beyond said housing openings and less than a longitudinal dimension of said cassette tape housing defined by a longitudinal axis extending through a center of said housing openings parallel to said front and rear major panels of said cassette tape housing,
 said elongate planar member having disposed on one of said pair of flat surfaces thereof a pair of spaced projections extending normal to said one flat surface and being spaced inwardly respectively from said first and second end edges, said planar member being positionable into an abutting relationship with a said tape cassette housing such that said projections extend into said housing openings, and wherein said projections each comprise a rectangular tab fixedly secured to said planar member and having a constant transverse cross-sectional dimension such that each projection is positionable into opposed diametrical slots of a corresponding sprocket wheel within an individual one of said housing openings of a said cassette tape housing to retain said planar member relative to said cassette tape housing, with said one flat surface of said planar member extending longitudinally between said projections for engaging the confronting surface of said major front or rear panels of said cassette tape housing, said planar member having a transverse extent between said pair of opposed side edges such that said planar member can engage the front or rear major panel of a said cassette tape housing without interference with said widened mouth area.

2. A tape cassette holder comprising:

a tape cassette having a pair of longitudinally spaced sprocket wheels enclosed within a cassette tape housing, said cassette tape housing having front and rear major panels, a widened mouth area adjacent one side of said panels of said cassette tape housing, and a pair of longitudinally spaced housing openings through which drive means for rotating said sprocket wheels can be inserted in an orthogonal direction relative to said front and rear major panels of said cassette tape housing, said sprocket wheels having circumferentially arrayed cogs defining diametrical slots in said openings, each said diametrical slot being of a predetermined width; and, an elongate planar member having a pair of opposed and parallel flat surfaces, said planar member further having respectively opposed first and second end edges, said first end edge being oriented parallel to said second end edge, with said first and second end edges being orthogonally oriented relative to said flat surfaces, said planar member still further having respectively opposed first and second side edges, said first side edge being oriented parallel to said second side edge, with said first and second side edges being orthogonally oriented relative to said flat surfaces, a dimension of said planar member between said end edges being greater than a dimensional spacing between said housing openings and less than a longitudinal dimension of said cassette tape housing defined by a longitudinal axis extending through a center of said housing openings parallel to said front and rear major panels of said cassette tape housing, said elongate planar member having disposed on one of said pair of flat surfaces thereof a pair of spaced projections extending normal to said one flat surface and being spaced inwardly respectively from said first and second end edges, the spacing between said projections being equal to a longitudinal spacing between said housing openings, and wherein said projections comprise rectangular tabs fixedly secured to said planar member and having a constant transverse cross-sectional dimension substantially equal to said predetermined width, each of said projections being received in opposed diametrical slots of a corresponding sprocket wheel within an individual one of said housing openings of said cassette tape housing to retain said planar member relative to said cassette tape housing, with said one flat surface of said planar member extending longitudinally between said projections and engaging the confronting surface of said major front or rear panels of said cassette tape housing, said planar member having a transverse extent between said pair of opposed side edges such that said planar member can engage the front or rear major panel of said cassette tape housing without interference with said widened mouth area.

* * * * *